United States Patent
Stinson et al.

(10) Patent No.: US 9,279,091 B2
(45) Date of Patent: Mar. 8, 2016

(54) CHARCOAL BRIQUETTES AND METHODS OF FORMING THEREOF

(75) Inventors: Phoebe Stinson, Pleasanton, CA (US);
Kevin Barry, Pleasanton, CA (US);
Anantdeep Gill, Pleasanton, CA (US);
Gregory M. Glenn, American Canyon, CA (US); Syed Hussain Imam, Walnut Creek, CA (US); Artur Klamczynski, Orinda, CA (US); Donald K. Swatling, Pleasanton, CA (US); Brian K. Cartwright, Pleasanton, CA (US);
Andrew Leppla, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 1059 days.

(21) Appl. No.: 12/963,398

(22) Filed: Dec. 8, 2010

(65) Prior Publication Data

US 2011/0099887 A1    May 5, 2011

Related U.S. Application Data

(63) Continuation-in-part of application No. 12/558,146, filed on Sep. 11, 2009.

(51) Int. Cl.
| | |
|---|---|
| *C10L 1/10* | (2006.01) |
| *C10L 5/08* | (2006.01) |
| *C10L 5/14* | (2006.01) |
| *C10L 5/36* | (2006.01) |
| *C10L 5/44* | (2006.01) |

(52) U.S. Cl.
CPC . *C10L 5/14* (2013.01); *C10L 5/361* (2013.01); *C10L 5/365* (2013.01); *C10L 5/44* (2013.01); *Y02E 50/10* (2013.01); *Y02E 50/30* (2013.01)

(58) Field of Classification Search
USPC .................................................... 44/280, 594
See application file for complete search history.

(56) References Cited

U.S. PATENT DOCUMENTS

| | | | | |
|---|---|---|---|---|
| 3,068,080 A | * | 12/1962 | Ronzio | 44/558 |
| 4,156,595 A | * | 5/1979 | Scott et al. | 44/578 |
| 4,225,318 A | * | 9/1980 | Wrigley, Jr. | 44/270 |
| 4,671,800 A | * | 6/1987 | Meyer et al. | 44/281 |
| 5,599,360 A | * | 2/1997 | Stillman | 44/522 |

FOREIGN PATENT DOCUMENTS

| | | | |
|---|---|---|---|
| EP | 0479487 A1 | * | 4/1992 |
| GB | 727701 | * | 4/1955 |
| WO | WO9207048 | * | 4/1992 |

* cited by examiner

*Primary Examiner* — Ellen McAvoy
*Assistant Examiner* — Ming Cheung Po
(74) *Attorney, Agent, or Firm* — Ann Lee

(57) ABSTRACT

A charcoal heating material, such as charcoal briquettes, includes a porous structure that facilitates the flow of oxygen about the charcoal, and thereby, enables the briquettes to ignite easily and quickly. In particular the lightweighted charcoal briquettes have a density from about 0.50 grams per cubic centimeter to about 0.80 grams per cubic centimeter. Methods of forming charcoal heating materials include mixing a rheology modifying agent and a moisture phase with a charcoal mixture to facilitate absorption of additional water into the solid matrix, providing increased porosity and lightweighting of the finished briquette after drying.

19 Claims, No Drawings

CHARCOAL BRIQUETTES AND METHODS OF FORMING THEREOF

CROSS-REFERENCE TO RELATED APPLICATIONS

The present application is a continuation-in-part of copending U.S. patent application Ser. No. 12/558,146, filed Sep. 11, 2009 and entitled "CHARCOAL-FOAM HEATING MATERIAL, the disclosure of which is incorporated by reference in its entirety.

BACKGROUND OF THE INVENTION

1. The Field of the Invention

The present invention relates to charcoal fuel heating materials. Specifically, the invention relates to lightweighted charcoal heating materials including a rheology modifying agent and to methods and compositions for making lightweighted charcoal heating materials, such as briquettes.

2. Relevant Art

Charcoal heating materials, such as charcoal briquettes, are commonly used for cooking food. Foods cooked with charcoal can have a unique flavor and have wide appeal. Conventional charcoal briquettes generally provide a slow-burning fuel with a high BTU output. In particular, the dense structure and low porosity of conventional charcoal briquettes allow the charcoal to burn slowly for an extended period of time.

One of the shortcomings of conventional charcoal briquettes is that the briquettes can be difficult to ignite and may not continue to burn, even after they appear to have been ignited. To address this problem, conventional charcoal manufacturers often spray the briquettes with a petroleum solvent to create "easy-to-light" briquettes. More commonly, a consumer will use lighter fluid to ignite the briquettes. Excess use of such flammable petroleum-based materials, however, may impart unwanted flavors and chemicals to the food. Additionally, the use of lighter fluid can emit volatile organic compounds (VOCs), which can have adverse short and/or long-term health effects.

In addition to the difficulty in lighting conventional charcoal briquettes, once ignited, conventional charcoal briquettes typically must complete an initial "ignition phase," or formation of visible ash on a majority of the briquette before they are suitable for cooking. Once past the ignition phase, the briquettes burn with an intense heat throughout a "burn phase" during which a consumer can use the briquettes for cooking. Unfortunately, the ignition phase of conventional briquettes often requires considerable time. Thus, conventional briquettes are often inadequate when a consumer desires a rapidly available heat source for cooking without undue delay.

Accordingly, there are a number of disadvantages in conventional charcoal briquettes that can be addressed.

BRIEF SUMMARY OF THE INVENTION

Implementations of the present invention solve one or more of the foregoing problems in the art with compositions and methods for forming more porous, charcoal heating materials. In particular, one or more implementations of the present invention can allow for the production of high porosity charcoal briquettes that ignite easily and quickly while reducing or even eliminating the need for petroleum-based lighting fluids. Furthermore, one or more implementations of the present invention can include methods of manufacture that are the same or similar to those used to manufacture conventional briquettes.

For example, an implementation of a charcoal heating material for use as a cooking fuel, which ignites easily and quickly, can include a mixture of char, optionally coal, a rheology modifying agent (e.g., a surfactant, a humectant or a water-swellable material), and a binder. As a result of the presence of the rheology modifying agent, the charcoal heating material may have a lower density and greater porosity than would otherwise exist absent the rheology modifying agent. By way of example, the charcoal heating material may comprise a porous structure having a density from about 0.50 grams per cubic centimeter to about 0.9 grams per cubic centimeter.

Additionally, an implementation of a composition for forming charcoal briquettes or other charcoal heating materials for use as a cooking fuel can include a mixture of char and optionally coal comprising from about 25 percent by weight of the composition to about 85 percent by weight of the composition. The composition can also include a binder comprising from about 2 percent by weight of the composition to about 15 percent by weight of the composition. Furthermore, the composition can include a rheology modifying agent comprising from about 0.1 percent by weight of the composition to about 10 percent by weight of the composition.

In addition to the foregoing, an implementation of a method of forming a porous, charcoal heating material that ignites easily and quickly can involve combining one or more of char, coal, a binder, an ignition aid, or an oxidizer to form a pre-mixture. At least a portion of the moisture phase may be added with the binder (e.g., so as to heat, cook or otherwise prepare the binder). The method can also involve adding a rheology modifying agent to the combination. In addition, the method can involve adding any remaining portion of the moisture phase to the pre-mixture at the same time as, or after, adding the rheology modifying agent to the pre-mixture components. Additionally, the method can involve mixing the combination, thereby allowing the rheology modifying agent to increase and/or accelerate absorption of the moisture phase into the various components, leading to increased porosity after the final product is dried, removing the water. Once the components have been sufficiently mixed together, the composition is compressed and shaped into a final desired configuration (e.g., by roll-pressing or extruding, etc.), and then dried.

Additional features and advantages of exemplary implementations of the present invention will be set forth in the description which follows, and in part will be evident from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

DETAILED DESCRIPTION OF THE PREFERRED EMBODIMENTS

Before describing the present invention in detail, it is to be understood that all publications, patents and patent applications cited herein, whether supra or infra, are hereby incorporated by reference in their entirety to the same extent as if each individual publication, patent or patent application was specifically and individually indicated to be incorporated by reference in its entirety.

It must be noted that, as used in this specification and the appended claims, the singular forms "a," "an" and "the" include plural referents unless the content clearly dictates otherwise. Thus, for example, reference to an "additive" includes two or more such additives.

Unless defined otherwise, all technical and scientific terms used herein have the same meaning as commonly understood by one of ordinary skill in the art to which the invention pertains. Unless otherwise stated, amounts listed in percentage ("%'s" are in weight percent.

One known process of forming charcoal heating materials involves preparing a charcoal mixture and a moisture phase to form a green mixture. The green mixture is then formed into the desired briquette shape by roll-pressing, extruding, etc. As used herein, the terms "green", "green mixture" or "green charcoal mixture" refer to the wet mixture from which the briquettes are formed, prior to drying. Other non-limiting methods of making briquettes are described in U.S. Pat. No. 5,762,656 by Burke and U.S. Pat. No. 5,049,333, herein incorporated by reference in their entirety.

The charcoal mixture may comprise traditional charcoal ingredients and/or other additives. For example, the charcoal mixture can include, but is not limited to, wood char, optionally coal, one or more binders, one or more ignition aids, one or more oxidizers, and/or other ingredients. As used herein, the term "wood char" or "char" refers to the hard fibrous substance that makes up the greater part of the stems, branches, and roots of trees or shrubs beneath the bark, which has been subjected to pyrolysis so as to convert the material to at least some extent to carbon. Thus, char is a comprehensive term, and includes retort chars, kiln chars, etc.

As used herein, the term "coal" refers to a solid combustible substance formed by the partial decomposition of vegetable matter without free access to air, under the influence of moisture, and often increased pressure and temperature. Furthermore, coal can include substances such as the foregoing either before or after partial burning and/or scorching in an oxygen-poor environment (or charring) such as might be carried out to remove undesirable components. One will appreciate, therefore, that coal can include lignite and lignite char, anthracite, semi-anthracite, bitumen, mineral carbons, and mixtures of any of the foregoing, as well as any partially burned or scorched portions thereof, etc.

The term "binder," as used herein, refers to materials that possess adhesive qualities that produce or promote the holding together of loosely aggregated components. Binders can include, but are not limited to, starch made from corn, milo, wheat, or other complex carbohydrates. The term "ignition aid," as used herein, refers to materials that are useful in the act or process of initiating combustion of a fuel or other component, such as a briquette. Thus, ignition aids can include, but are not limited to, sawdust, fines resulting from char production, other particulate cellulosic matter, solvents, aliphatic and petroleum hydrocarbons, and mixtures and blends thereof. As used herein, the term "oxidizer" refers to any material or component which can effectively increase the supply of oxygen to combustible ingredients, such as nitrates.

"Other ingredients" as used herein refers to additional components which may be desirable to include in a briquette. Such as, for instance, components to enhance appearance or aesthetic qualities. Examples of such components include fillers, ash whiteness enhancers (e.g., limestone), processing aids (e.g., Borax), flavoring agents (e.g., mesquite) as well as combinations of any of the foregoing.

The present invention is directed to compositions and methods for forming charcoal heating materials having increased porosity. In particular, one or more implementations of the present invention can allow for the production of charcoal briquettes that ignite easily and quickly. Specific embodiments may reduce or even eliminate the need for petroleum-based lighting fluids. Additionally, one or more implementations of the present invention may include methods of manufacturing that are the same as or similar to those used to manufacture conventional briquettes.

For instance, one or more implementations of the present invention can involve the use of a rheology modifying agent (e.g., a surfactant, humectant or water-swellable material) in connection with the formation of a charcoal briquette. The rheology modifying agent enables more water to be added to the green mixture, which provides a significant processing benefit which is realized when the green mixture is compressed. More specifically, a user can add a rheology modifying agent to a green mixture to increase and/or accelerate absorption of moisture by the various components or in the case of a water-swellable rheology modifying agent absorption of the water itself. The inventors have found that the inclusion of a rheology modifying agent increases the fraction of moisture phase that may be added and absorbed by the green charcoal mixture while still preventing agglomeration of solid materials that occurs when the fraction of the moisture phase is too great. In other words, when a rheology modifying agent is included, more water may be added and absorbed, resulting in a higher porosity product after drying. Absorption of the moisture phase into the various components displaces solid material and air in the green mixture making it more resistant to compression. For example, the water displaces solid material in the press pockets as less charcoal material can be pressed into a fixed volume. Void spaces are left within the compressed, shaped briquettes as they are dried, providing for increased porosity to the compressed, shaped, dried briquette as compared to porosity that would be exhibited without the addition of the rheology modifying agent and additional water. Increased porosity also correlates to decreased density of the charcoal heating material.

Implementations of the present invention allow the manufacturer the ability to control the porosity, density and heating characteristics of the charcoal heating material by varying the amount of char or coal, the fraction and type of rheology modifying agent, fraction of the moisture phase added (i.e., water), mixing times, and/or mixing conditions for the charcoal manufacturing process. Thus, lightweighted charcoal heating materials having increased porosity and/or decreased density may be provided.

The ability to produce a lightweighted charcoal heating product of lower density, and thus lower weight per volume provides significant manufacturing and delivery cost advantages. For example, production of a given volume of such lower density charcoal heating material requires less raw materials in the form of char, coal, binder, and other components as compared to the production of the same volume of a higher density charcoal heating material. This represents a lower manufacturing cost. Furthermore, because the given volume of lower density charcoal heating material weighs less, costs for shipping of a lightweighted charcoal are also significantly reduced.

As mentioned previously, implementations of the present invention can also include lightweighted charcoal briquettes that ignite easily and quickly while reducing or perhaps even eliminating the need for petroleum-based lighting fluids. One will appreciate in light of the disclosure herein that the increased ease with which a user can ignite the charcoal heating materials of the present invention can be at least in part because of the increased burning surface area, enhanced air flow and oxygen supply provided by the more porous configuration of the heating materials. Thus, the increased porosity of the charcoal heating materials of the present invention can not only improve fast burn performance, reduce costs, but also potentially lower VOC emissions associated with the use of charcoal heating materials, as less of any volatile organic ignition aid may be needed. In addition, the lower density provides for a more rapid increase in temperature of the charcoal pile resulting in more complete combustion of any VOCs present and a lower VOC emission per burn event.

As a preliminary matter, implementations of the present invention are described herein primarily with reference to charcoal briquettes. As used herein, a briquette refers to a charcoal material that is sized and shaped for use as a heating material for cooking. The size and weight of a briquette may vary widely. Typical charcoal briquette dimensions may range from about 2 cm by about 2 cm by about 1 cm (e.g., about 4 cm$^3$) to about 10 cm by about 10 cm by about 5 cm (e.g., 500 cm$^3$). The weight of such briquettes may vary between less than 10 grams and about 1000 grams. A more typical briquette may measure about 3 cm by about 3 cm by about 2 cm (e.g., about 15 cm$^3$) and weigh about 20 to about 40 grams.

Typical briquettes may assume various shapes, for example, generally rectangular, or may include one or more curved surfaces (e.g., top and bottom surfaces may be convexly curved outward). One will appreciate, however, that charcoal briquettes are only one type of charcoal heating material which a user may form using the methods and compositions described herein. For example, a user can use implementations of the present invention to form not only charcoal briquettes, but also logs, cubes, other geometric forms, or any discrete shape consistent with the intended use of a charcoal product.

Regardless, implementations of the present invention may involve forming a porous, lightweighted charcoal heating material, such as a charcoal briquette, by combining a rheology modifying agent, such as a surfactant, humectant or water-swellable material, with a charcoal mixture and a moisture phase to form a green charcoal mixture. The rheology modifying agent increases water absorption into the components of the charcoal mixture or absorbs water itself. Typically, if too much water is added, the solid components begin to agglomerate, reducing the ability of the green mixture to efficiently flow through the system and be pressed into briquettes. The inventors have found that the addition of the rheology modifying agent increases the amount of water that may be added to the system before agglomeration becomes an issue. As more water is added into the system, water displaces other materials and leaves void space in the briquettes as they dry. Because more water can be added, the pore density of the dried briquettes is greater than it would be absent the action of the rheology modifying agent and increased moisture phase. The increased porosity in the final product reduces the weight of the heating material, increases the surface area, and otherwise enhances the properties of the lightweighted charcoal heating material.

Implementations of the present invention contemplate the use of a wide range of rheology modifying agents. As the charcoal heating materials of the present invention may comprise a cooking fuel, in some implementations it is preferred that the rheology modifying agents not include or result in the formation of toxic chemicals upon combustion, or that would otherwise be unsafe for human consumption. For example, it may be preferable that the rheology modifying agents not contain nitrogen. Similarly, it is preferred that formaldehyde not be included within any included rheology modifying agent mixture (e.g., formaldehyde may sometimes be present within a rheology modifying agent mixture as a preservative or stabilizer). In some embodiments, the rheology modifying agent may be substantially dry. In another embodiment, the rheology modifying agent may comprise a mixture where the rheology modifying agent is mixed or dissolved in a solvent (e.g., water or other liquid). In one embodiment, any organic backbone component of the rheology modifying agent is a compound or compounds comprising only carbon, hydrogen, and oxygen atoms (e.g., sodium lauryl sulfate and/or an alkyl polyglycoside are particularly suitable). Preferably, the backbone of the rheology modifying agent comprises non-cyclic, relatively long chains comprising between about 8 and about 22 carbon atoms, more preferably between about 10 and about 20 carbon atoms, and most preferably between about 12 and about 18 carbon atoms. Exemplary rheology modifying agents may comprise anionic surfactants such as carboxylic acid salts, sulfonic acid salts, sulfuric acid ester salts, phosphoric acid esters, and/or fatty acid salts. More specific classes of such suitable rheology modifying agents may include sodium alkyl ($C_{12}$-$C_{18}$) sulfates, ethoxylated sodium alkyl ($C_{12}$-$C_{18}$) sulfates, sulfosuccinate sodium salts, sodium alkyl ($C_{12}$-$C_{18}$) sulfites, potassium alkyl ($C_{12}$-$C_{18}$) sulfates, ethoxylated potassium alkyl ($C_{12}$-$C_{18}$) sulfates, alkyl polyglycosides, alcohol ethoxylates ($C_{12}$-$C_{18}$), sodium or potassium salts of fatty acids, starch-based surfactants, polypeptide-alkylene polyol condensates. Specific examples of suitable anionic surfactant rheology modifying agents include sodium lauryl sulfate, ethylhexyl sodium sulfate, and/or disodium laureth sulfosuccinate.

Suitable rheology modifying agents may include anionic surfactants and/or nonionic surfactants. Such surfactants may be protein based, and/or have a synthetic or organic base. More specific examples of suitable surfactants may include, but are not limited to, anionic surfactants such as sodium lauryl sulfate, sodium alpha sulfo methyl $C_{12\text{-}18}$ esters, disodium alpha sulfo $C_{12\text{-}18}$ fatty acid salts, alcohol ethoxylates, nonionic surfactants such as alkyl polyglycosides. Other suitable rheology modifying agents may include starch-based surfactants.

More specifically, a composition for forming a lightweighted charcoal heating material in accordance with one or more implementations of the present invention can comprise a mixture of char and optionally coal, a binder, and a rheology modifying agent. One will appreciate in light of the disclosure herein that the composition can also optionally include one or more ignition aids, oxidizers, and/or other ingredients. Furthermore, a manufacturer can base the composition upon a set of desired characteristics of the finished lightweighted charcoal heating material. Of course, as the porosity of the charcoal heating material is increased, a manufacturer may reduce or possibly even eliminate the use of ignition aids and oxidizers. The reduction in the use of ignition aids can reduce the VOC emissions of the resulting charcoal heating material, resulting in a more environmentally friendly product.

In some implementations, the mixture of char and optionally coal can comprise from about 25 percent by weight of the composition to about 85 percent by weight of the composition. Preferably, the mixture of char and optionally coal comprises from about 30 percent by weight of the composition to about 80 percent by weight of the composition, more preferably from about 40 percent to about 80 percent by weight of the composition. In some implementations, the binder can comprise from about 2 percent by weight of the composition to about 15 percent by weight of the composition. Preferably, the binder comprises from about 5 percent by weight of the composition to about 9 percent by weight of the composition.

Furthermore, the rheology modifying agent can comprise from about 0.1 percent by weight of the composition to about 10 percent by weight of the composition. Preferably, the rheology modifying agent comprises from about 0.2 percent by weight of the composition to about 0.7 percent by weight of the composition. It should be noted that the percents by weight discussed herein refer to percent of active ingredients. Thus, water (which is largely driven off during drying) or other substances added to dilute, suspend, or otherwise modify one of the aforementioned components typically do not factor into the percents by weight.

Of course, one will appreciate in light of the disclosure herein that the composition used to manufacture the charcoal material includes a moisture phase. The water or moisture phase may be included with one or more of the aforementioned components, such as an aqueous starch, nitrate, or borax. The moisture phase can help facilitate bonding and/or adhesion of the various components of the composition and work in conjunction with the rheology modifying agent to increase porosity of the finished product.

One will appreciate in light of the disclosure herein that the manufacturer can control or vary the fractions of the rheology modifying agent and/or the moisture phase relative to the other components (e.g., the substantially dry components included in a pre-mixture before the rheology modifying agent is added), which affects the density of the resulting product. In one implementation, the moisture phase may comprise 25 percent by weight of the composition to about 50 percent by weight of the composition. In another implementation, the moisture phase comprises from about 30 percent by weight of the composition to about 40 percent by weight of the composition, more preferably from about 30 percent to about 38 percent by weight of the composition. As mentioned previously, this range of moisture content is greater than that typically present within a composition used to form a conventional charcoal briquette absent a rheology modifying agent (e.g., which may exhibit moisture of 26-28%). Use of such high moisture contents without a rheology modifying agent results in agglomeration of the solids within the composition, interfering with the ability of the composition to efficiently flow and be pressed or extruded into briquettes. The presence of the rheology modifying agent (which acts as a flow aid) allows use of these higher moisture phase fractions without significant agglomeration of solids, as the water is more completely absorbed into the solid components. Absorption of the water into the solid components (e.g., char, coal, binder, ignition aids, oxidizers, etc.) or the rheology modifying agent itself is advantageous as the excess water resists compression, thereby allowing less solid material to be compacted into the briquette to form the solid matrix. The amount of void space left in the dried briquette contributes to the porosity and density of the briquette. Because the rheology modifying agent increases the amount of moisture that can be absorbed the solid components, its use also acts as a flow aid, allowing for processing through a greater range of moisture content.

The ratio of the moisture phase relative to the substantially dry components (e.g., typically including at least char, coal, and binder) within the green mixture may typically range between about 1:1.5 and about 1:4, typically between about 1:2 to about 1:3. For example, green moisture fractions between about 30% and about 38% have been found to work particularly well, which values are higher than those needed to prevent agglomeration absent a rheology modifying agent. Higher fractions of moisture phase have been found by the inventors to be too "soupy" while also leading to agglomeration of solids in the mixer, inhibiting flow and making it difficult to press or extrude out the charcoal briquettes. Lower fractions of moisture phase may of course be too thick as to be difficult to process within a continuous operation. The moisture phase may be added all at once or in fractions. For example, in one method, at least a portion of the moisture phase is combined with the binder and other substantially dry components of the pre-mixture before the rheology modifying agent is added. Combining at least a portion of the moisture phase with the binder is beneficial where a starch binder is to be cooked. The cooked binder may then be added to the other dry components. About half or more of the total moisture phase may be combined with the binder and cooked. Any remaining portion of the moisture phase not added with the binder may be added to the pre-mixture (e.g., with the rheology modifying agent).

In addition to compositions, implementations of the present invention also include methods of forming porous lightweighted charcoal heating materials. The following describes at least one implementation of a method of using a rheology modifying agent (e.g., a surfactant) to create a more porous, lightweighted charcoal heating material. Of course, as a preliminary matter, one will recognize that the methods explained in detail can be modified in a wide variety of ways to create a wide variety of products using one or more aspects of the present invention. In particular, various acts of the method described below can be omitted or expanded, and the order of the various acts of the method described can be altered. Thus, one should view the following acts or steps as exemplary of one implementation of a method in accordance with the present invention.

For example, in at least one method of the present invention, a manufacturer can combine one or more of char, coal, a binder, an ignition aid (e.g., sawdust and/or fines resulting from char production), an oxidizer, or other ingredients to form a pre-mixture. These components may be substantially dry, although typically at least a portion of the moisture phase is added with the binder and/or is inherent to the raw materials. Specifically, in one implementation the manufacturer can combine char, coal, sawdust, and limestone to form a substantially dry mixture. Binder and at least a portion of the moisture phase may be combined with the dry components. Of course, depending upon the desired characteristics of the lightweighted charcoal heating material, the user can vary the components of the pre-mixture (i.e., those dry components combined together before the rheology modifying agent is added). Once all the pre-mixture components are added (e.g., including at least some of the moisture phase), the user can then add a rheology modifying agent to the pre-mixture, and any remaining portion of the moisture phase. The user can add the remaining portion of the moisture phase to the pre-mixture at the same time as, before, or after adding the rheology modifying agent to the pre-mixture.

One will appreciate that the rheology modifying agent may comprise a substantially dry component, or mixture of components, or an aqueous solution. Furthermore, the order of mixing the various components of the composition may depend on the properties of the rheology modifying agent. In particular, the inventors have found that optimal mixing times (or residence times within a mixer of a continuous process) generally range between about 1 to about 4 minutes, more preferably about 2 to about 3 minutes. In general, the mixing time needs to be sufficient to mix the components into a substantially homogenous mixture, while providing sufficient time for water to be absorbed into the solid components. Not only is the volume of water absorbed increased, but absorption time is advantageously reduced as a result of the action of the rheology modifying agent. Nevertheless, it is desirable to not overmix the components because overmixing can result in the starch phase "setting up," increasing density.

As used herein, the term "substantially dry" refers to components or the combination of components that may typically be in solid (e.g., powdered and/or crushed) form, and in which little or no additional water is typically added. The term does not imply that no water is present, or even that the manufacturer may not intentionally add some amount of water. For example, some moisture (e.g., bound or unbound) may be present within the various components, and/or some quantity of water may be added at this stage, although generally less than about 10 percent by weight. The upper limit of any water content within a substantially dry mixture is certainly variable. In at least some embodiments, for example, water is added to a substantially dry mixture in combination with a binder and/or with a rheology modifying agent before the composition is compressed and shaped into charcoal briquettes or other heating material configurations. As such, the term is simply descriptive of typical characteristics of a preliminary mixture, for example, containing char, optionally coal, and/or other components before the addition of a moisture phase. In one embodiment, about half or more of the total moisture phase is combined with the binder, which is heated so as to cook the binder. This cooked binder including moisture phase is combined with the above substantially dry ingredients.

In some implementations the manufacturer may ensure that the rheology modifying agent is added to the pre-mixture in connection with a portion of the moisture phase. In one example, a manufacturer can mix a moisture phase comprising water, a starch, and an aqueous rheology modifying agent together, and then add this pre-mixture to the substantially dry components. In alternative implementations, the manufacturer can add an aqueous rheology modifying agent, e.g. a surfactant, after the moisture phase has been added to the pre-mixture. In another example, the rheology modifying agent may be added as a dry solid (e.g., powdered) to the pre-mixture (which may be substantially dry—depending on whether significant water is added with the binder), after which water is then added to the mixture.

In any event, the rheology modifying agent causes the solid components of the composition to absorb more water than they otherwise would. In particular, the rheology modifying agent facilitates absorption of excess water into the solid components of the composition or in the case of a rheology modifying agent that comprises a water-swellable material, the rheology modifying agent absorbs much of the water itself. This water resists compression during pressing into briquettes, thereby allowing less solid material to be compacted into the briquette during shaping. Once the briquette, dries, the water is driven off, resulting in a higher pore density and lower overall density than would otherwise occur. The rheology modifying agent further acts as a flow aid so as to increase the range of moisture phase values over which processing can efficiently occur without significant agglomeration. Furthermore, the inventors have found that under any given conditions, the composition including the rheology modifying agent can be processed at a higher flowrate as compared to an otherwise identical composition not including the rheology modifying agent. These characteristics of the rheology modifying agent as a flow aid are further advantageous as they correlate to greater manufacturing production capacity by simply adding the rheology modifying agent.

After mixing, the user can then compress and shape the combination into a desired final configuration, such as a briquette. Compression and shaping may be accomplished by any suitable means, for example a roll-press, an extruder, or other type of agglomeration technique.

One will appreciate in light of the disclosure herein that lightweighted briquettes may be structurally weaker than charcoal briquettes without a rheology modifying agent in the formulation. Nonetheless, the inventors have found that lightweighted briquettes formed by a roll-press or extruder can be stronger than a briquette simply formed by pouring and curing. For this reason, forming by a process that employs some degree of compaction and/or shear, such as a roll-press, an extruder, or a similar agglomeration unit is necessary to effectively practice the invention.

For example, as briquettes are pressed, in roll-presses or otherwise, compaction and associated air escape can occur. This relates to another superior aspect of the manufacturing process as compared to processes that rely on foam formation for increased pore density. Because the increased porosity is the result of water filled voids rather than air filled voids (i.e., foaming), and water is largely incompressible, there is little reduction in pore density as a result of compaction during shaping.

Charcoal briquettes formed from one or more compositions including a rheology modifying agent may exhibit a reduction in density relative to a conventional briquette not including a rheology modifying agent of up to about 25%. In some implementations, lightweighted briquettes of the present invention can have a reduction in density from about 5% to about 20%. In yet further implementations, lightweighted briquettes of the present invention can have a reduction in density of about 2%, 5%, 7%, 10%, 12%, 15%, or about 20%.

Indeed, lightweighted briquettes of the present invention can have a porous structure having a density from about 0.50 grams per cubic centimeter to about 0.90 grams per cubic centimeter. In additional implementations, lightweighted briquettes of the present invention can have a porous structure having a density from about 0.50 grams per cubic centimeter to about 0.75 grams per cubic centimeter (e.g., 0.55 grams per cubic centimeter to about 0.75 grams per cubic centimeter). In yet further implementations, lightweighted briquettes of the present invention can have a porous structure having a density from about 0.60 grams per cubic centimeter to about 0.70 grams per cubic centimeter. For example, lightweighted briquettes of the present invention can have a porous structure having a density of about 0.65 grams per cubic centimeter. Importantly, the density of the lightweighted briquette is less than it would be absent the rheology modifying agent and increased moisture.

For example, some briquettes having no coal and no rheology modifying agent may currently exhibit densities as low as about 0.6 grams per cubic centimeter. In these cases, such low density is achieved by altering the raw material composition, not by increasing the porosity of the material. For example, briquettes containing no coal with a rheology modifying agent will exhibit even lower densities and higher porosity (e.g., as low as about 0.5 grams per cubic centimeter). Similarly, briquettes including char, coal, and a rheology modifying agent will exhibit increased porosity and thus lower density relative to a briquette that is otherwise equal but for the presence of the rheology modifying agent. In one embodiment, such briquettes may exhibit densities between about 0.5 grams per cubic centimeter and 0.7 grams per cubic centimeter.

In addition to a reduction in density, lightweighted briquettes of the present invention may emit considerably less VOCs than conventional briquettes. This is because there is a reduced need to use a volatile hydrocarbon petroleum based ignition aid as a result of the increased porosity. For example, in some implementations, lightweighted briquettes of the present invention may exhibit a reduction in VOCs from about 5% to about 60%. In additional implementations, lightweighted briquettes of the present invention may have about a 15% reduction, about a 20% reduction, about a 30% reduction, or about a 50% reduction in VOCs. For instance, the VOC emissions of some lightweighted briquettes of the present invention may be well below the regulatory limit of 0.020 lb/burn (e.g., about 0.01 lb/burn or less).

EXAMPLES

The below examples are exemplary formulations and manufacturing conditions that were actually carried out by the inventors. Batches 1, 2 and 3 were performed using the following active components (not including water). "Carbonaceous Materials" includes one or more of char, coal, petcoke, or lignite. Binder includes starch. Borax (a processing aid) may be included with the binder. "Other Standard Materials" includes one or more of lime, fines, or nitrates.

| Component | wt % (Batch 1) | wt % (Batches 2 and 3) |
|---|---|---|
| Carbonaceous Materials | 81.6% | 81% |
| Binder | 7.9% | 7.9% |
| Other Standard Materials | 10.5% | 10.5% |
| Rheology modifying agent | 0% | 0.6% | water/starch binder mixture was added. The rheology modifying agent was mixed with the other components (except control batch 1, which included no rheology modifying agent). APG and SLS are alkyl polyglycoside (APG) and sodium lauryl sulfate (SLS) rheology modifying agents, respectively. APG is available as Glucopan from Cognis Care Chemicals Monheim, Germany and SLS is available as Stepanol from Stepan Company, Northfield, Ill.

With respect to the mixing time, all batches were mixed for 2 minutes in a LITTLEFORD type mixer (available from Littleford Day, Inc., located in Florence, Ky.) followed by 2 minutes mixing in a Muller type mixer. Once mixed, the green composition was roll-pressed to form individual briquettes. Even though batches 2 and 3 contained about 36 and about 38 percent water respectively, these batches did not show any significant agglomeration of solids within the equipment. This water content is significantly higher than the 28-29% water of batch 1. The density was measured using a glass bead displacement technique to measure briquette volume. Glass bead density measurements are well known to those skilled in the art. The glass bead density (GBD) of each run was measured by placing an individual finished briquette within a container, and then filling the container with glass beads so as to measure the volume of glass beads displaced by the briquette.

Control batch 1 shows an average GBD of 0.78 g/cm$^3$. Batch 2 shows an average GBD of 0.76 g/cm$^3$. This represents a 3% reduction in average GBD. Batch 3 shows an average GBD of 0.72 g/cm$^3$. This represents a 7% reduction in average GBD.

The below examples are additional exemplary formulations and manufacturing conditions that were actually carried out by the inventors. Batches 4, 5, and 6 were performed using

| Example | 1A | 1B | 1C | 2A | 2B | 2C | 3A | 3B | 3C |
|---|---|---|---|---|---|---|---|---|---|
| Rheology modifying agent | None | None | None | APG | APG | APG | SLS | SLS | SLS |
| % Rheology modifying agent | 0 | 0 | 0 | 0.6 | 0.6 | 0.6 | 0.6 | 0.6 | 0.6 |
| % Target Moisture | 29 | 28 | 28 | 36 | 36 | 36 | 38 | 38 | 38 |
| Green Weight (g) | 345 | 340 | 331 | 342 | 337 | 330 | 333 | 336 | 336 |
| Green Strength (lbf) | 12.8 ± 2.8 | 16.6 ± 2.7 | 15.4 ± 2.7 | 16.2 ± 1.9 | 17.6 ± 1.8 | 18.4 ± 2.8 | 12.0 ± 1.3 | 12.9 ± 1.0 | 12.0 ± 0.9 |
| Briquette Material Density (g/cm$^3$) | 0.78 | 0.78 | 0.77 | 0.75 | 0.76 | 0.76 | 0.73 | 0.72 | 0.72 |

Each batch included three repetitions, as shown in the table above. The dry components were mixed together, and then the the following active components other than the rheology modifying agent (and not including water):

| Example | | 4-11 (wt %) | 12-19 (wt %) |
|---|---|---|---|
| Carbonaceous Materials | | 81.6 | 82 |
| Binder | | 7.9 | 7.9 |
| Other Standard Materials | | 10.5 | 10.1 |

| Example | 4 | 5 | 6 | 7 | 8 | 9 | 10 | 11 |
|---|---|---|---|---|---|---|---|---|
| Rheology modifying agent | None | None | None | None | SLS | SLS | SLS | SLS |
| % Rheology modifying agent | 0 | 0 | 0 | 0 | 0.6 | 0.6 | 0.6 | 0.6 |
| % Target Moisture | 26 | 30 | 34 | 38 | 26 | 30 | 34 | 38 |
| % Agglomerates | 0 | 0.95 | 1.9 | 4.6 | 0.93 | 0.72 | 0 | 0.41 |
| Flowrate (dry basis lb/s) | 0.556 | 0.507 | 0.514 | 0.419 | 0.566 | 0.579 | 0.550 | 0.503 |

-continued

| Example | 12 | 13 | 14 | 15 | 16 | 17 | 18 | 19 |
|---|---|---|---|---|---|---|---|---|
| Rheology modifying agent | None | None | None | None | SLS | SLS | SLS | SLS |
| % Rheology modifying agent | 0 | 0 | 0 | 0 | 0.6 | 0.6 | 0.6 | 0.6 |
| % Target Moisture | 26 | 30 | 34 | 22 | 26 | 30 | 34 | 22 |
| % Agglomerates | 2.11 | 2.2 | 7.71 | 0 | 0.33 | 0 | 2.61 | 0 |
| Flowrate (dry basis lb/s) | 0.595 | 0.526 | 0.476 | 0.574 | 0.636 | 0.605 | 0.52 | 0.616 |

Batches 4-19 were prepared in a similar manner as batches 1-3. In order to evaluate agglomeration for each given batch, a consistent amount of material was collected from the plough mixer, weighed, and screened through a ¾ inch mesh screen. Material that did not pass through the mesh screen was collected and noted in the table as "% Agglomerates". Mass flowrate was measured by removing the press rolls from the equipment and collecting and weighing material exiting the auger for a given period of time. Control batches 4-7 show a steady increase in agglomeration as moisture content increases. Batches 8-11, which include a rheology modifying agent, exhibit little or no agglomeration, even as the moisture content reaches 38%. Furthermore, flowrates as measured through the auger decrease with increasing moisture for control batches 4-7 and control batches 12-15. Flowrates as measured through the auger for batches 8-11 and 16-19 are significantly higher than those of their respective controls, which include no rheology modifying agent. Flow rates in the range of 0.5-0.7 lbs/s are preferred.

One will appreciate in light of the disclosure herein that the present invention may be embodied in other specific forms without departing from its spirit or essential characteristics. For example, in alternative embodiments, the lightweighted charcoal heating material may be formed into logs and used as a long-burning heating fuel. Further, a variety of additives may be used to impart a predetermined flavor to cooked items and further enhance the heating/cooking qualities of the lightweighted charcoal heating material.

Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of forming a porous, charcoal heating material that ignites easily and quickly, comprising:
   combining at least char, a binder and at least a portion of a moisture phase to form a pre-mixture;
   combining a rheology modifying agent with the pre-mixture, wherein said rheology modifying agent is present in an amount between 0.1 weight percent and 0.6 weight percent;
   combining any remaining portion of the moisture phase with the pre-mixture;
   mixing the char, the binder, the rheology modifying agent, and the moisture phase together so as to result in a green charcoal mixture;
   compressing and shaping the green charcoal mixture into a briquette; and
   drying the briquette to form a porous, charcoal heating material that ignites easily and quickly.

2. The method as recited in claim 1, wherein any remaining portion of the moisture phase and the rheology modifying agent are premixed together and then added into the pre-mixture simultaneously with one another.

3. The method as recited in claim 1, wherein the rheology modifying agent is initially substantially dry and is added to the char and the binder prior to the addition of any moisture phase.

4. The method as recited in claim 1, wherein a ratio of the moisture phase relative to the char, binder, and any other substantially dry components of the pre-mixture is between about 1:1.5 and about 1:4.

5. The method as recited in claim 4, wherein the combination of char, the binder, the rheology modifying agent, and the moisture phase is mixed for a time between about 1 and about 4 minutes.

6. The method as recited in claim 1, wherein the rheology modifying agent comprises one or more of a carboxylic acid salt, a sulfonic acid salt, a sulfuric acid ester salt, a phosphoric acid ester, or a fatty acid salt.

7. The method as recited in claim 1, wherein the rheology modifying agent comprises one or more of a sodium alkyl ($C_{12}$-$C_{18}$) sulfate, an ethoxylated sodium alkyl ($C_{12}$-$C_{18}$) sulfate, a sulfosuccinate sodium salt, a sodium alkyl ($C_{12}$-$C_{18}$) sulfite, a potassium alkyl ($C_{12}$-$C_{18}$) sulfate, an ethoxylated potassium alkyl ($C_{12}$-$C_{18}$) sulfate, an alkyl polyglycoside, an alcohol ethoxylate ($C_{12}$-$C_{18}$), a sodium or potassium salt of a fatty acid, a starch-based surfactant, or a polypeptide-alkylene polyol condensate.

8. The method as recited in claim 1, wherein the compression step is accomplished using a roll-press and wherein the flow rate through the roll-press is 0.5-0.7 lbs/sec on a dry basis.

9. The method as recited in claim 1, wherein the percentage of agglomerates in the green charcoal mixture is significantly less than the percent of agglomerates in a green charcoal mixture that does not contain a rheology modifying agent.

10. A composition for forming charcoal briquettes or other charcoal heating material for use as a cooking fuel, the composition comprising:
    a mixture of char and optionally coal comprising about 25 percent to about 85 percent of the composition by weight;
    a binder comprising about 2 percent to about 15 percent of the composition by weight;
    water; and
    a rheology modifying agent for aiding and increasing absorption of the water into one or more of the binder, char, or coal, the rheology modifying agent comprising about 0.1 percent to about 1 percent of the composition by weight in order to facilitate producing a porous, charcoal heating material that ignites easily and quickly.

11. The composition as recited in claim 10, wherein the water comprises between about 30 percent and about 38 percent of the composition by weight.

12. The composition as recited in claim 10, wherein the rheology modifying agent comprises from about 0.1 percent to about 0.6 percent of the composition by weight.

13. The composition as recited in claim 12, wherein the composition is substantially void of foam.

14. The composition as recited in claim 10, wherein the percentage of agglomerates is below 5% by weight of the composition.

15. A lightweighted charcoal heating material for use as a cooking fuel, which ignites easily and quickly, the charcoal heating material being formed by the process comprising:
    combining at least char, a binder and at least a portion of a moisture phase to form a pre-mixture;
    combining a rheology modifying agent with the pre-mixture;
    combining any remaining portion of the moisture phase with the pre-mixture;
    mixing the char, the binder, the rheology modifying agent, and the moisture phase together so as to result in a green charcoal mixture;
    compressing and shaping the green charcoal mixture into a briquette, wherein the rheology modifying agent acts to increase absorption of the moisture phase into the other components of the green charcoal mixture such that the moisture phase displaces other components during the compressing and shaping; and
    drying the briquette so as to substantially drive off the moisture phase, resulting in a briquette having a glass bead density of 0.76 g/cm$^3$ or less.

16. The charcoal heating material of claim 15, wherein the rheology modifying agent comprises at least one of sodium lauryl sulfate or an alkyl polyglycoside.

17. The charcoal heating material of claim 15, wherein the rheology modifying agent is present in an amount between 0.1-0.6 percent by weight of the charcoal heating material.

18. The charcoal heating material of claim 15, wherein the step of compressing and shaping is accomplished using a roll-press at a dry basis flow rate of 0.5-0.7 lbs/sec.

19. A method of forming a porous, charcoal heating material that ignites easily and quickly, comprising:
    combining at least char, abinder at least a portion of a moistures phase to form a pre-mixture;
    combining any remaining portion of the moisture phase with the pre-mixture;
    mixing the char, the binder, the rheology modifying agent, and the moisture phase together so as to result in a green charcoal mixture;
    compressing and shaping the green charcoal mixture into a briquette; and
    drying the briquette to form a porous, charcoal heating material that ignites easily and quickly, wherein the compression step is accomplished using a roll-press and wherein the flow rate through the roll-press is 0.5-0.7 lbs/sec on a dry basis.

* * * * *